(12) United States Patent
Adams

(10) Patent No.: US 6,454,233 B1
(45) Date of Patent: Sep. 24, 2002

(54) DISENGAGEABLE SELF-LOCKING PIVOTAL BRACKET

(76) Inventor: Michael E. Adams, 2009 Walters Ave., Northbrook, IL (US) 60062

( * ) Notice: Subject to any disclaimer, the term of this patent is extended or adjusted under 35 U.S.C. 154(b) by 0 days.

(21) Appl. No.: 09/350,835

(22) Filed: Jul. 9, 1999

(51) Int. Cl.[7] ................................................. E04G 3/00
(52) U.S. Cl. ........................ 248/291.1; 43/12; 403/102
(58) Field of Search ........................ 403/109.3, 102, 403/101, 59; 43/12; 446/220, 79, 223, 221, 235, 226, 291.1; D24/440; D15/199; D21/84; 248/288.11, 292.13

(56) References Cited

U.S. PATENT DOCUMENTS

| | | | |
|---|---|---|---|
| 325,287 A | 9/1885 | Utley | 43/12 |
| 1,450,322 A | 4/1923 | McElhany | 43/12 |
| 2,590,249 A | 3/1952 | Hörgárd | 43/12 |
| 2,739,403 A | * 3/1956 | Kalmus | 43/12 |
| 2,800,737 A | 7/1957 | Crossan | 43/12 |
| 3,638,977 A | * 2/1972 | Purrer | 287/99 |
| 4,619,065 A | 10/1986 | Jones | 43/11 |
| 5,099,597 A | 3/1992 | Whistle | 43/11 |
| 5,131,178 A | * 7/1992 | Stoliar et al. | 43/12 |
| 5,422,001 A | 6/1995 | Yagoda et al. | 210/169 |
| 5,471,778 A | * 12/1995 | Marfori | 43/12 |

* cited by examiner

Primary Examiner—Anita King
Assistant Examiner—Gwendolyn Baxter
(74) Attorney, Agent, or Firm—Olson & Hierl, Ltd.

(57) ABSTRACT

A disengageable self-locking pivotal bracket device with a body member having a first and second surface. The device includes an axial/fastener and disengageable locking element for pivotally and releaseably locking the device into and out of at least one engaged position. The present invention can be used as foldable, pivotal connecting element that can connect two member; for example a fishnet and handle, or two sections of a cane.

26 Claims, 6 Drawing Sheets

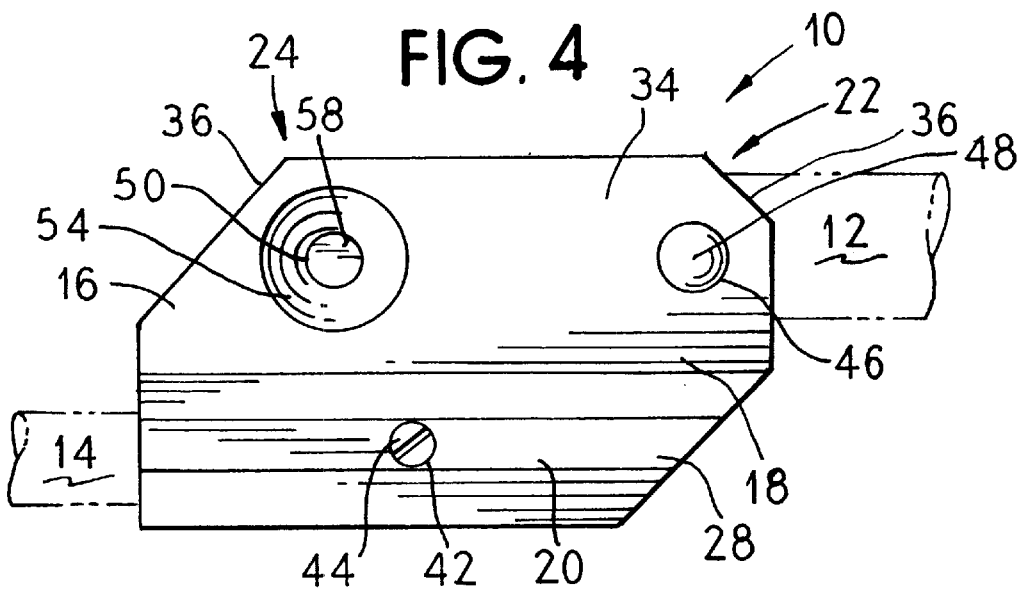
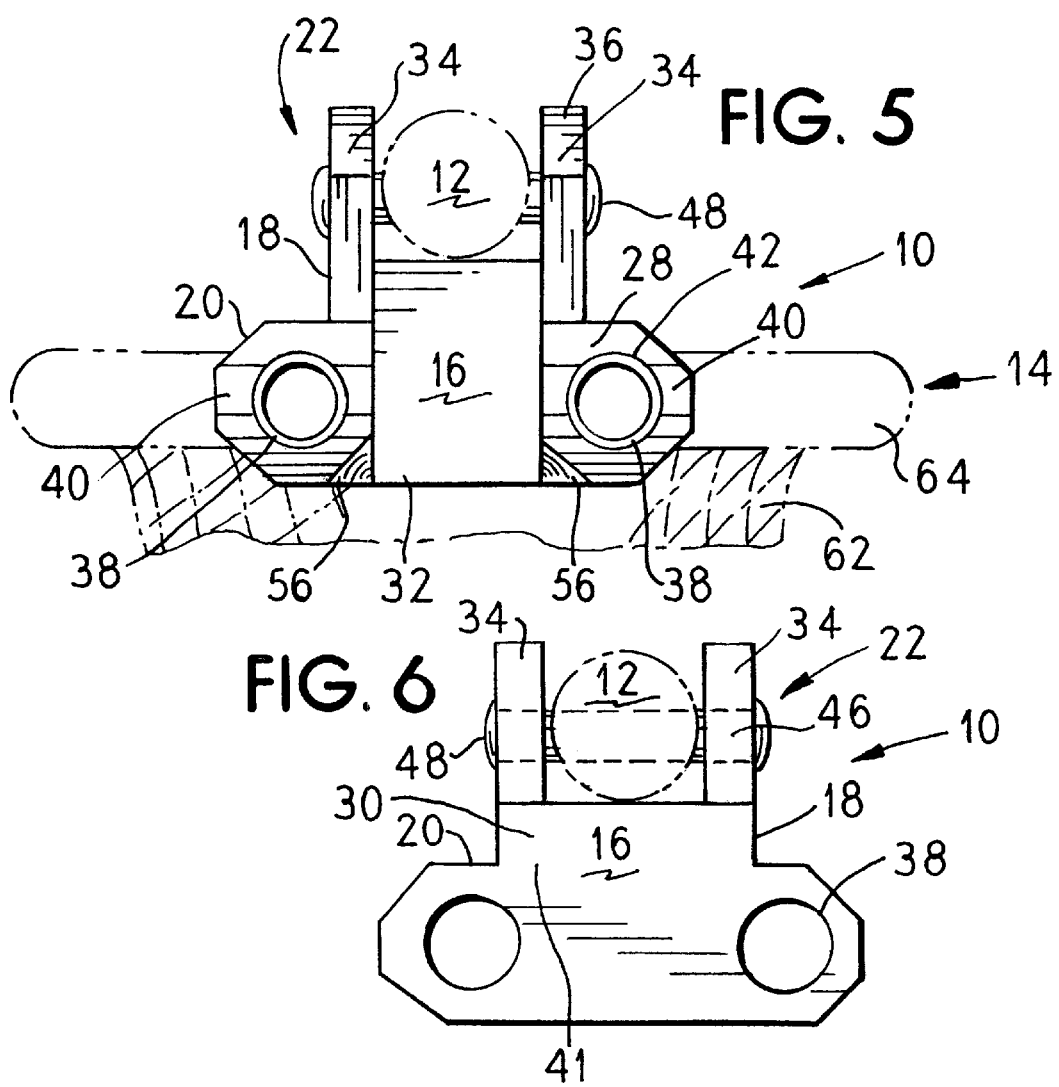

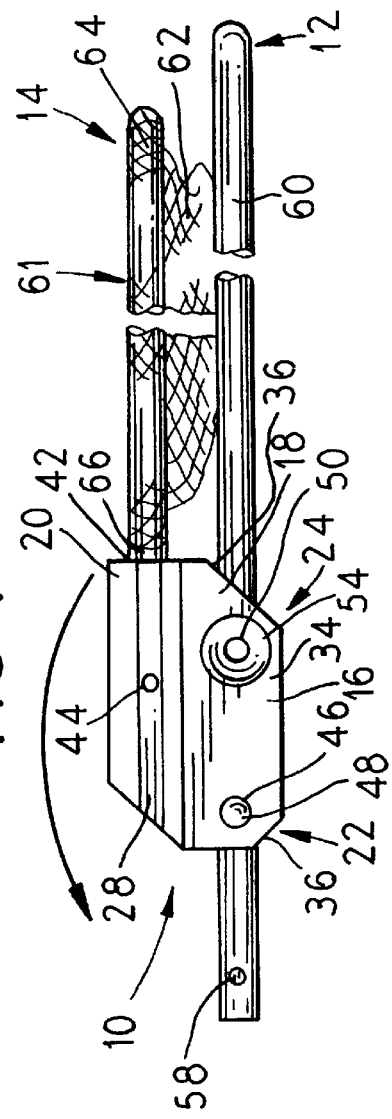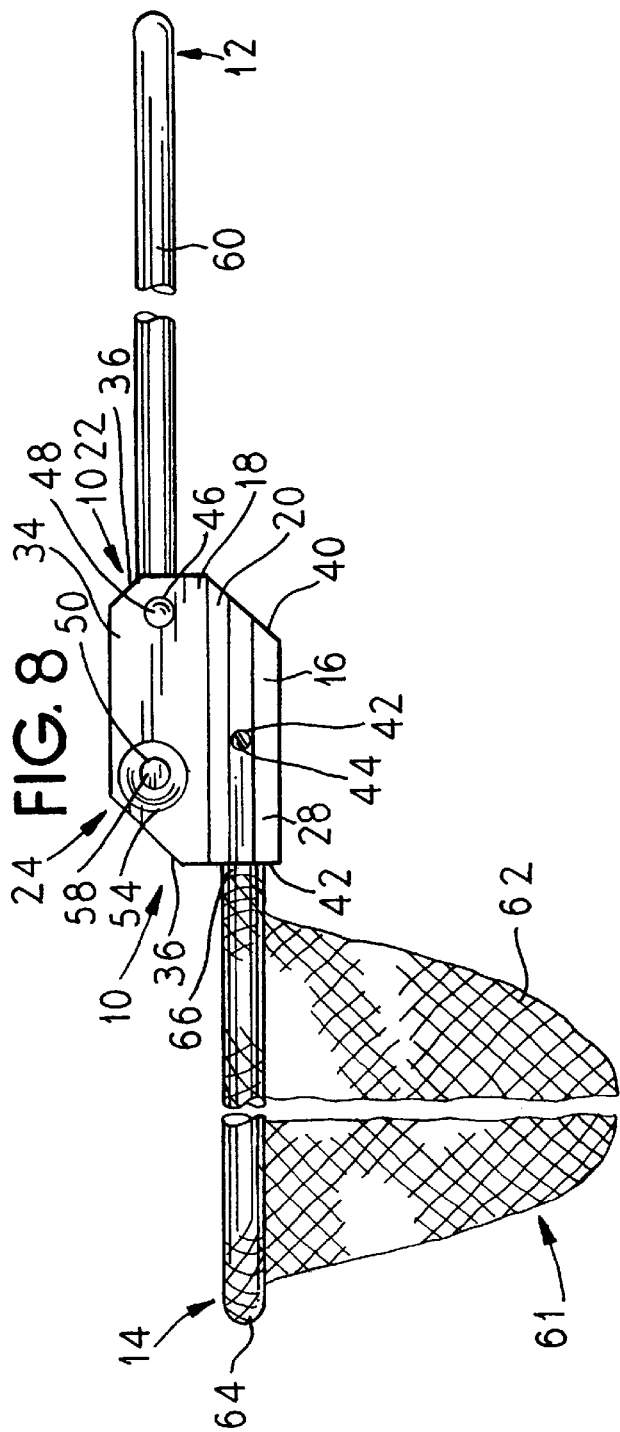

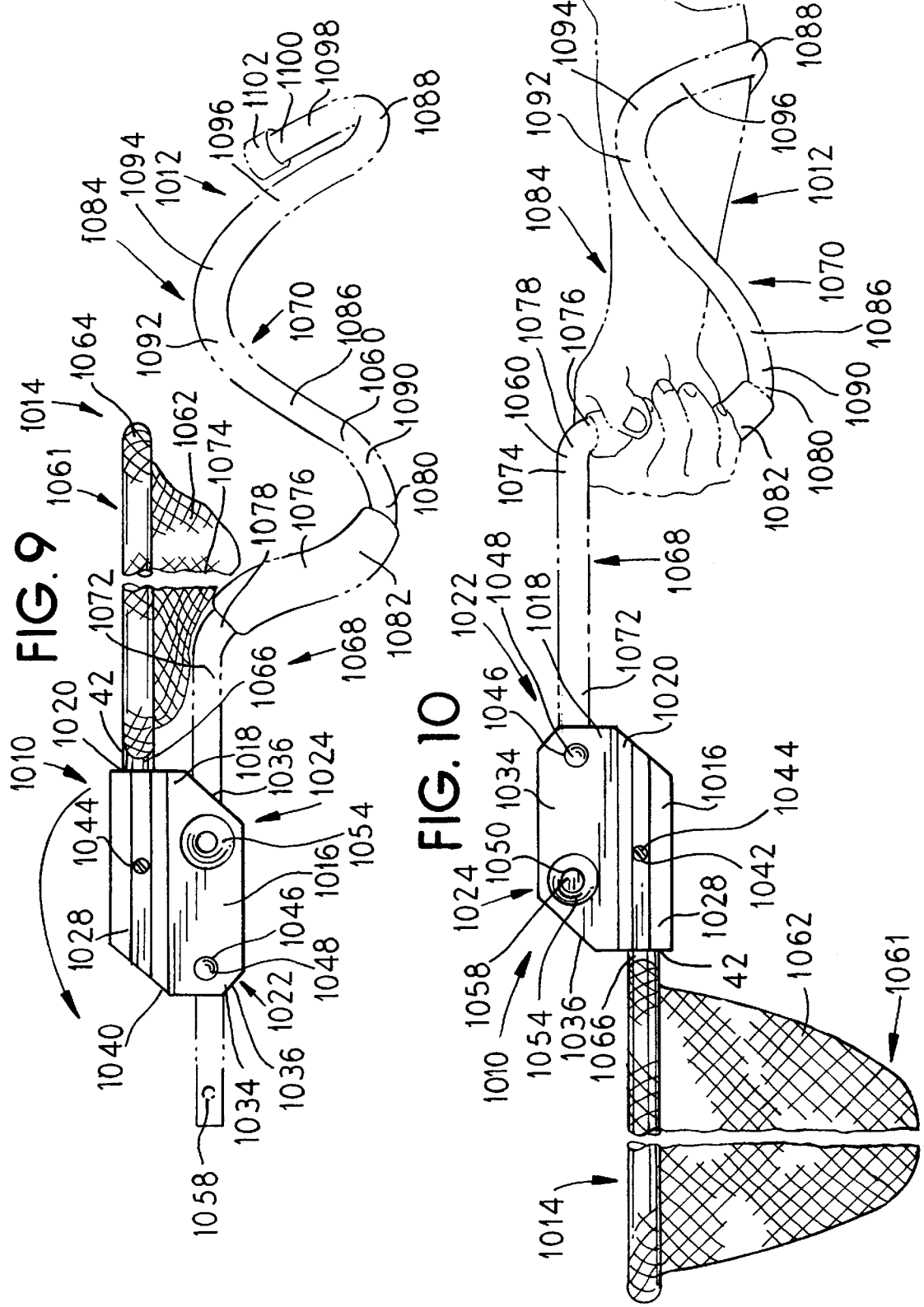

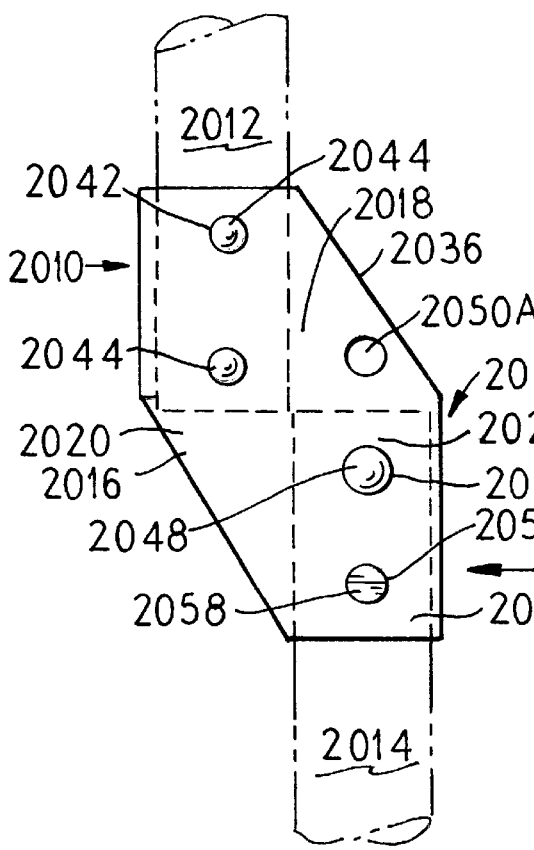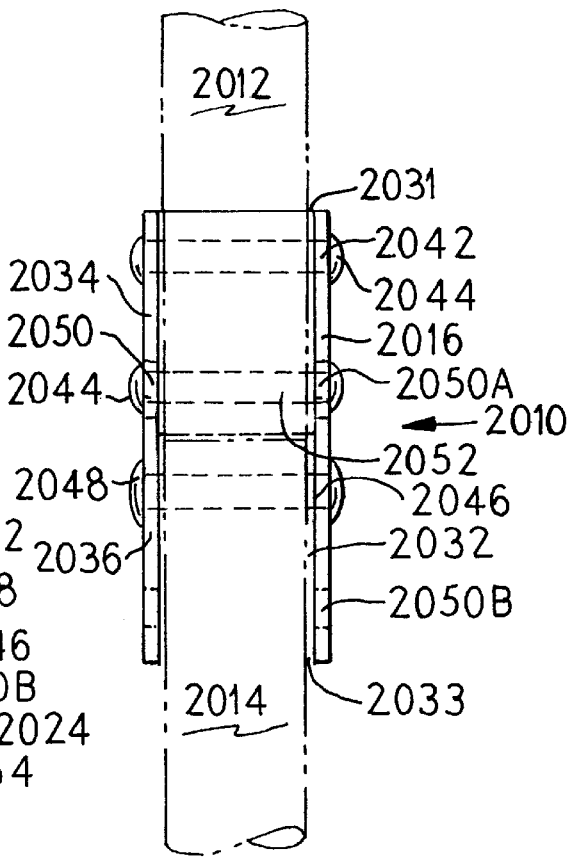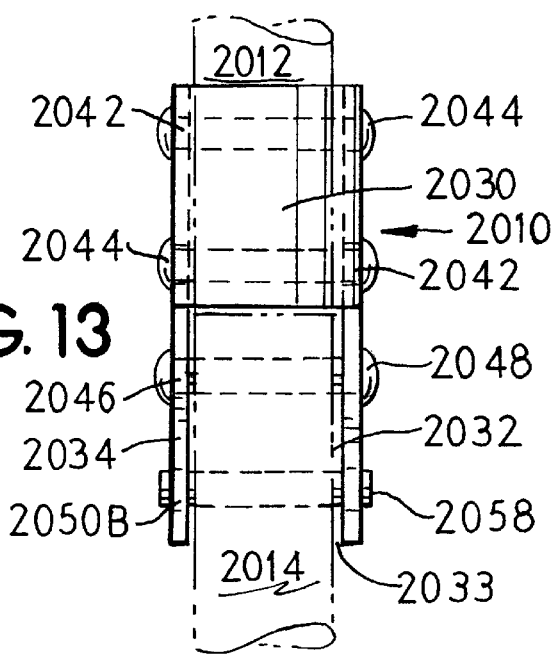

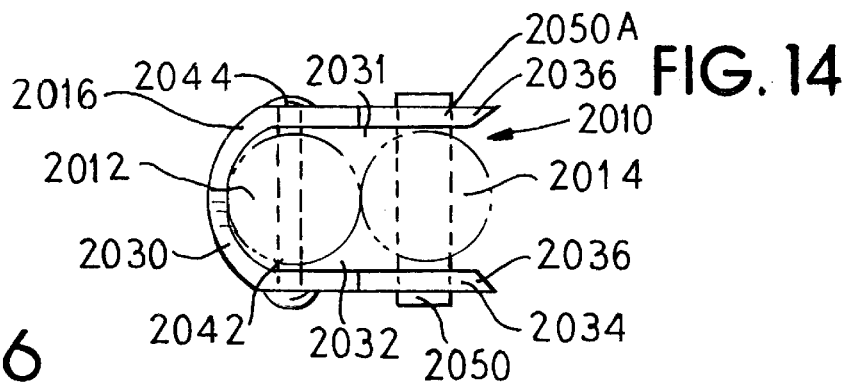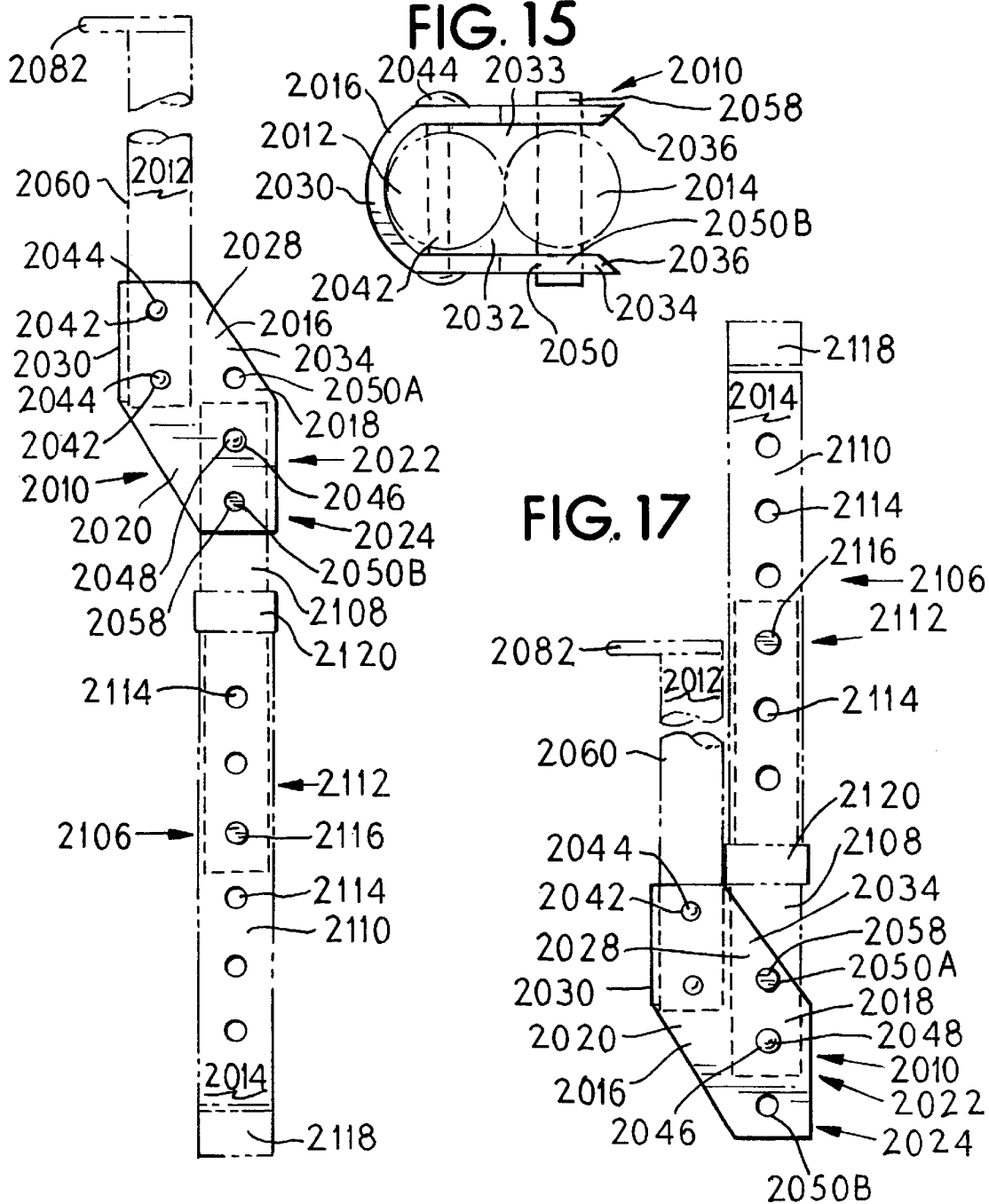

DISENGAGEABLE SELF-LOCKING PIVOTAL BRACKET

TECHNICAL FIELD OF THE INVENTION

This invention relates to a disengageable self-locking, pivotal bracket, and more specifically to such a bracket used to pivotally connect at least two members in a self-locking manner.

BACKGROUND OF THE INVENTION

Connecting two elements to form an elongated device is well known in the art. Generally, a hinge is used to connect two separate elements, so that the elements can be extended to form one elongated device. While easy to construct, most of such prior art brackets are not highly regarded.

Sportfishing nets have long featured a certain type of bracket for the purpose of movably fixing one portion (the net hoop unit) to a second portion (the handle). Usually referred to as a "yoke", this specialty bracket is attached to the distal end of the net hoop unit so that it slip fits over the handle, and is releasably engaged at one end of the handle by a "snap button" type locking fastener.

While useful from the standpoint of enabling the user to slide the "nethead" up the handle in a reciprocal manner for storage purposes, this very sliding action will eventually mar the finish of the handle tube. Further, when it is time to use the net, i.e., land a fish, the fact that this type of bracket is not self-locking requires extra effort on the part of the fisherman just when time is at a premium.

Among known fishing nets, only the Dotline "Quick Draw" collapsible net features a net that pivots between a closed position and a self-locking open position for shipping and storage, as opposed to a bracket that slides along the handle. The Dotline product features a pair of hoop shanks that each pivot about their own axis, to both "swing" the net open or closed and to actuate a spring-loaded plate and plunger locking mechanism.

One characteristic that the above devices and brackets have in common is that they generally require two hands to extend or unfold the elements and lock the bracket in place. For example, when using the disengageable lockable bracket, the user must hold the bracket in one hand, manipulate the engaging device with the other hand so that it is in the disengaged position, unfold or extend the elements, while at the same time maintaining the engaging device in the disengaged position, then release the engaging device, forming the elongated element. In addition, prior art sliding disengagable brackets are known to score and otherwise damage the finish of the extending elements.

A need exists in the art for a simple disengageable pivotal bracket device that can be used to replace existing bracket devices. A bracket device, particularly a bracket device joining at least two members and is self-locking, is preferable. It would also be beneficial to the user not to have to manipulate the bracket to lock it, or any of the elements, in position. Rather, the user should only have to manipulate the device to disengage the locking element so that it can be closed. The device also should be simple, inexpensive, and easy to make and use.

SUMMARY OF THE INVENTION

The present invention is a simple disengageable self-locking, foldable, pivotal bracket device. This bracket device, particularly when used with at least two members, provides a self-locking foldable, pivotal system that does not require the user to manipulate the bracket to lock it, or any of the elements, in position. The user need only flick or snap the device, similar to casting in fly fishing, to open the elongated device and lock the bracket in place. The bracket need only be manually manipulated by the user to disengage the locking element of the bracket device so that the extended element can be closed. This device is simple, inexpensive, and easy to make and use.

More specifically, the present device includes a self-locking connecting device with a body member having a first portion and a second portion, at least one connecting element and at least one locking connector element defined in the body member for locking the device in a first (extended) position. The at least one locking connector element comprises at least one aperture, preferably having a concavity portion in proximity thereto, formed in the body member, preferably in an extended portion.

It is further contemplated that the device include a slot and at least one concave engaging portion defined in the body member at the second portion in proximity to the slot. Other elements are also contemplated, including at least one pivot aperture, at least one connecting aperture and at least one securing aperture all formed in the body member.

In another embodiment, the present invention includes the lockable device similar to that described above. This embodiment further includes a first and second member pivotally connected to the device. It is contemplated that the first member is a handle, while the second member comprises any suitable device such as a catch device, a net assembly, a grasping device or a lower support member.

Numerous other advantages and features of the present invention will become readily apparent from the following detailed description of the invention, from the claims, and from the accompanying drawings.

BRIEF DESCRIPTION OF THE DRAWINGS

In the drawings that form a part of the specification, and in which like numerals are employed to designate like parts throughout the same.

FIG. 4 is a side elevational view of the bracket of FIG. 1 depicting the members in phantom;

FIG. 5 is a first end elevational view of the bracket of FIG. 1 depicting one member and connecting elements in phantom;

FIG. 6 is second end elevational view of the bracket of FIG. 1 depicting the members and connecting elements in phantom;

FIG. 7 is a side elevational view of the embodiment of FIG. 1 in a disengaged (retracted) position;

FIG. 8 is a side elevational view of the embodiment of FIGS. 1 and 7 in an engaged (extended) position;

FIG. 9 is a side elevational view of an alternate embodiment of the present invention of FIG. 1 in a disengaged (retracted) position;

FIG. 10 is a side elevational view of the embodiment of FIG. 9 in a engaged (extended) position;

FIG. 11 is an elevational view of an alternate embodiment of the bracket of FIG. 1 in accordance with the present invention;

FIG. 12 is a first side elevational view of the bracket of FIG. 11 depicting the members and connecting elements in phantom;

FIG. 13 is a second side elevational view of the bracket of FIG. 11 depicting the members and connecting elements in phantom;

FIG. 14 is a top plan view of the bracket of FIG. 11 depicting the members and connecting elements in phantom;

FIG. 15 is a bottom plan view of the bracket of FIG. 11 depicting the members and connecting elements in phantom;

FIG. 16 is side elevational view of an alternate embodiment of present invention of FIG. 1 in a open position; and FIG. 17 is side elevational view of the embodiment of FIG. 16 in a closed position.

DESCRIPTION OF THE PREFERRED EMBODIMENT

Figure 1:
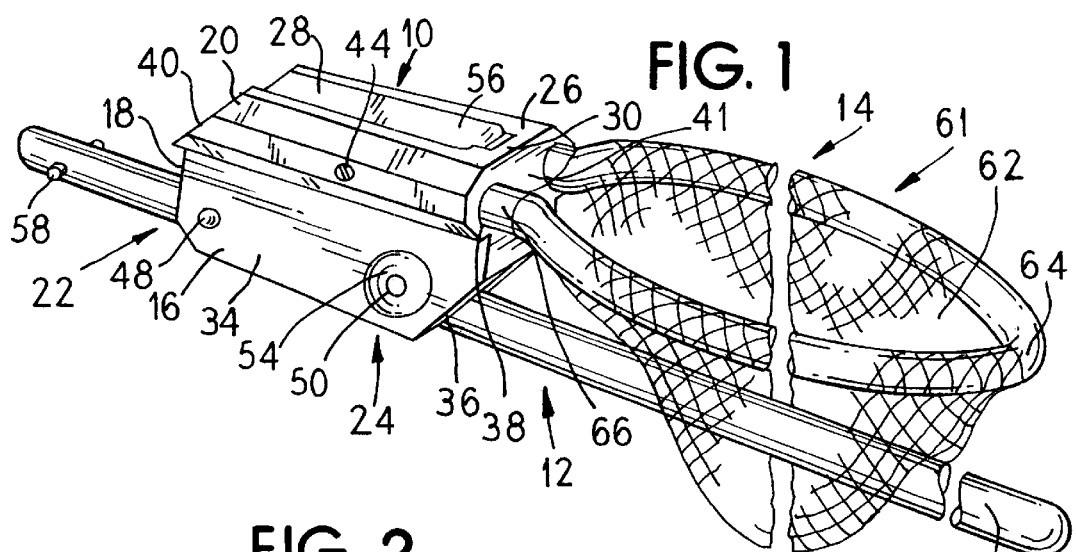
FIG. 1 is a perspective view of one embodiment of the present invention in a closed, disengaged position.

While this invention can be embodied in many different forms, there are shown in the drawings and described in detail, preferred embodiments of the present invention. The present disclosure is an exemplification of the principles of the invention and is not intended to limit the invention to the embodiments illustrated.

Referring to FIG. 1 of the drawings, one embodiment of a disengageable, self-locking pivotal bracket or connector device, generally designated 10, is shown used with a first and second members, generally 12 and 14 respectively, in a second (retracted) position. In the embodiment depicted in FIG. 1, first and second members 12, 14 comprise a handle and catch device or net assembly.

Figure 2:
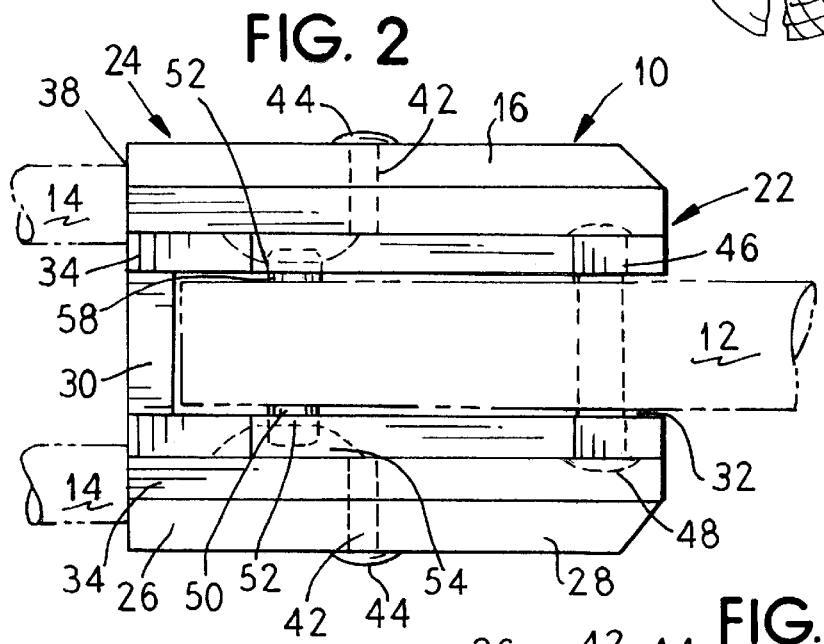
FIG. 2 is a top plan view of the bracket of FIG. 1 depicting the members and connecting elements in phantom.
Figure 3:
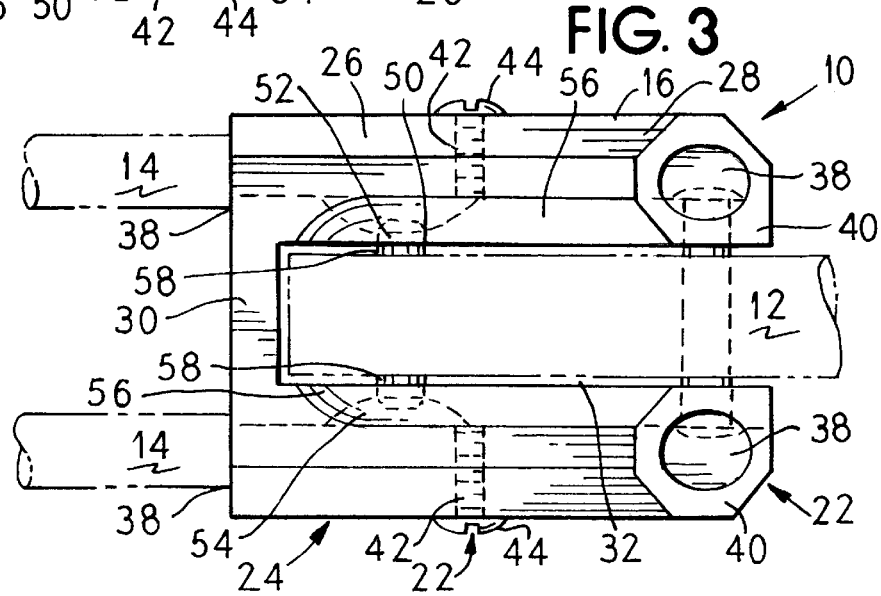
FIG. 3 is a bottom plan view of the bracket of FIG. 1 depicting the members and connecting elements in phantom.

Turning now to FIGS. 2 and 3, a top and bottom plan view of the device 10 of FIG. 1 is depicted with the members 12, 14, and the connecting elements in phantom. Device 10 is preferably a simple, inexpensive, one-piece construction of metal material, molded plastic and/or glass filled plastic, that allows the user to securely mount the members 12, 14 thereto. The device 10 can be made by any method of manufacture suitable for making metal or plastic pieces including injection molding or machining.

Device 10 includes a body member 16 having a first portion 18 and second portion 20 (best seen in FIG. 3). As shown in the FIG. 1, device 10 includes at least one connecting element 22 and one locking connector element 24 suitable for locking the device 10 in an first (extended) position, both of which are defined in body member 16. In one preferred embodiment, connecting and locking connector elements 22, 24 are formed in body member 16 at opposite ends thereof, although other positioning of these elements is contemplated.

FIGS. 2 and 3 further reveal that body member 16 includes a U-shaped portion 26, comprised of projecting portions 28 and substantially flat support portion 30, defining at least one slot 32. While a U-shaped portion is shown and described, other configurations are contemplated, including an H-shape. Slot 32 enables device 10 to operably receive the first member 12, when device 10, and thus second member 14, are in the extended position.

Upon further inspection of FIG. 2, it is noted that device 10 includes at least one extended portion or wing 34 having at least one beveled edge 36, joined to and integral with U-shaped portion 26 of body member 16 at first portion 18. In one preferred embodiment shown in the drawings (best viewed in FIG. 4) device 10 includes two wings 34, each with opposing beveled edges 36, that act to further define slot 32 and receive the first member 12 when in the retracted position as shown in FIG. 1.

As shown, projecting portions 28 are hollowed out, defining at least one bore 38 extending therethrough, acting as a connecting aperture formed in the body member 16, whereby the second member 14 can be secured to the device 10. In the illustrated embodiment, two bores 38 are shown, each in fluid communication with beveled edge 40, opposite flat edges 41, of projecting portions 28. In addition, at least one securing aperture 42 (shown in phantom in FIGS. 2 and 3) is formed in projecting portions of body member 16 and operably associated with the bores 38.

In one preferred embodiment, securing apertures 42 are formed in each projecting portion 28. It is contemplated the securing aperture 42 can be operably associated with a securing device 44 (shown in phantom in FIG. 1), whereby the second member 14 can be secured to the device 10. While a bolt is shown, any type of securing device, including screws, pins, rivets, or even gluing, bonding, etc, are contemplated.

Attention is now directed to the connecting element 22 discussed briefly above. In one preferred embodiment shown in FIG. 4, connecting element 22 comprises at least one pivot aperture 46 (shown in phantom in FIGS. 2 and 3) defined in body member 16. In one preferred embodiment, pivot apertures 44 are formed in each wing 34 of body member 16, which allows the device 10 to move in a pivotal manner about an axis defined by the aperture 46. It is further contemplated that pivot aperture 46 can operably engage a pivot device 48 (shown in phantom in FIG. 6), operably associated with the first member 12, whereby the device 10, and thus second member 14, can move in a foldable, pivotal manner in relation to the first member 12.

While it is not necessary that device 10 be associated with either members 12 or 14, in the preferred embodiment, a pivot device, preferably an axial rivet, is shown in positional relationship with pivot apertures 46 so that device 10 is operably associated with the first member 12 as shown in FIGS. 5 and 6. While an axial rivet is described, any suitable device, including screws, pins, bolts, rivets, is contemplated.

Having observed the details of the connecting element 22, attention may now be given to the locking connector element 24. Returning to the side elevational view of FIG. 4, connector element 24 of device 10 is preferably comprised of at least one aperture, a connecting aperture 50, defined in body member 16. In one embodiment, the at least one connecting aperture 50 is formed in at least one wing 34 in fluid communication with a connecting bore 52 which in turn is in fluid communication with slot 32 (shown in phantom in FIGS. 2 and 3).

The locking connector element 24 further comprises at least one indent or concave portion, generally designated as concave portion 54, formed in the body member 16 proximate connector aperture 50. Furthermore, at least one other indent or concavity, generally designated as concave engaging portion 56, is formed in body member 16 at second portion 20, proximate slot 32. Again it is contemplated that body member 16 include two concave portions 54 and concave engaging portions 56, where concave portions 54 are located proximate connector apertures 50 and concave engaging portions 56 are on second portion 20 located on opposing sides of slot 32.

Additionally, it is contemplated that the at least one locking connector element 24 is preferably comprised of two connecting apertures 50 each defined in wings 34 in fluid communication with connecting bores 52 (shown in phantom in FIGS. 2 and 3). As discussed above, it is contemplated that device 10 can be used with at least two members, first and second members 12 and 14. In one preferred embodiment, locking connector element 24, comprised of connecting apertures 50 formed in the two wings 34, is aligned and operably associated with a retaining device 58, which in turn is operably associated with first member 12.

In the embodiment shown, retaining device 58 is in a spaced relationship with the apertures 50 and comprised of a pair of opposing detent pins operably connected together by a spring device contained in first member 12. While detent pins are depicted, any type of retractable or spring operated retaining device, including snap buttons, pins, detent balls, etc. is contemplated. Retaining device 58 operably engages apertures 50 when the device 10 and second member 14 are in the first (extended) position.

As provided above, two concave portions 54 are formed in the wings 34 of body member 16 proximate connector apertures 50, in addition to two concave engaging portions 56 defined in body member 16 at second portion 20 proximate, and on opposing portions of, slot 32. The concave portions 50 provide a means for the user to access retaining device 58, when retaining device 58 engages the apertures 50. That is, the concave portions 54 allow the user to use his fingers to push the retaining device 58 in towards the center of first member 12 so that the retaining device 58 disengages from the connector apertures 50. This means that the second member 14 is free to move towards the disengaged position.

Concave engaging portions 56 act to operably engage the retaining device 58, so that the second member 14 can be locked in the first position. As the device 10 and second member 14 are moved towards the first (extended) position, the concave engaging portions 56 comes in contact with, and engages, the retaining device 58 so that the retaining device 58 is moved inwards towards the center of the first member 12. As device 10 continues to move towards the engaged position, wings 34 act to maintain such inward position of the retaining device 58. When the device 10 moves to the first (extended) position, the connector apertures 50 are positionally aligned with the retaining device 58, allowing the retaining device 58 to move or spring outwards, away from the center of the first member 12, lockably engaging the device 10.

Turning now to the FIGS. 7 and 8, one embodiment of the present invention is shown comprised of at least first and second members 12 and 14, and device 10, where the second member 14 can move through approximately 180 degrees of motion with respect to the first member. FIGS. 7 and 8 depict both the second (retracted) position and the first (extended) position, respectively. It should be noted that while only two elements and one device are shown, multiple combinations thereof are contemplated so that the members and devices can be alternated to continuously fold back upon themselves in a Z- or snake-like fashion, similar to the old traditional foldable carpenter rulers.

A cursory review of FIGS. 7 and 8 shows that the first member 12 comprises a handle 60 while the second member 14 comprises a catch device. While the catch device is depicted as a net assembly 61 including net 62 and net support 64, any suitable device, including a holding device similar to that used to retrieve golf balls or a grasping device, is contemplated. Furthermore, second member could comprise some additional article, including a lifting apparatus or a work piece like hand-held or power tools.

The self-locking device 10 as depicted is similar to that described above. Device 10 includes body member 16; first and second portions 18, 20; pivot aperture 46 defined in body member 16 pivotally associated with first member 12; and locking connector element 24 for securing device 10 and the second member 14 in an extended position.

U-shaped portion 26 defines slot 32, whereby slot 32 operably receives first member 12 in the first (extended) position. The two extended portions or wings 34 are joined to and integral with body member 16 at first portion 18 on opposite sides of slot 32. Locking connector element 24 is comprised of two securing apertures 42, where one aperture is formed in each of the wings 34 in spaced relationship to first and second portions 18 and 20, positionally aligned with each other, and aligned and operably associated with retaining device 58.

As discussed above, retaining device 58 is preferably a detent element operably associated with first member 12 and in positional relationship with connector apertures 50, whereby retaining device 58 operably engages the apertures 50 when the device 10 and the second member 14 are in the first (extended) position.

Locking connector element 24 further comprises a concave portion 54 defined in each of the two wings 34 proximate apertures 50, so that retaining device 58 may be accessed by the user when it engages the aperture 50, and may be disengaged.

While not shown in FIGS. 7 and 8, the device 10 further includes two concave engaging portions 56 defined in body member 16 at second portion 20 proximate, and on opposing portions of, slot 32. As the device 10 and second member 14 are moved towards the first position, the concave engaging portions 56 come in contact with and engage the retaining device 58, so that the retaining device 58 is moved inward toward the center of the first member 12. As device 10 continues to move toward the first position, wings 34 maintain the position of the retaining device 58. When the device 10 moves to the first position, the connector apertures 50 are positionally aligned with the retaining device 58, allowing the retaining device 58 to move outward, away from the center of the first member 12, lockably engaging the device 10.

Body member 16 also includes two pivot apertures 46 formed in the wings 34 that operably engage the pivot device 48 operably associated with first member 12. As described above, while many pivot devices 48 are contemplated, an axial rivet is depicted operably associated with first member 12 and in positional relationship with pivot apertures 46.

It is evident from the drawings that second member 14 could comprise a catch device or net assembly 61, including net 62 and net support 64. Net support 64 is a loop-like structure having shank portions 66 which are inserted into and engage bores 38. Securing apertures 42 are formed in each projecting portion 28 which in turn are operably associated with a securing device 44, so that the shanks 66 can be secured to the device 10. While a bolt is depicted, any type of securing device, including screws, pins, rivets, gluing, bonding, etc, are contemplated.

Furthermore, while net assembly 61 is depicted as being relatively small with respect to handle 60, it is provided for illustrative purposes only. Any size or shaped net 62 is contemplated. Moreover, net assembly 61 could be collapsible or foldable. Additionally, while two shank portions 66 are shown, net support 64 could be formed so that only one shank portion engages the device 10 or that device 10 and net support 64 are formed as a single unit.

In operation, the user manually grasps the handle 60. The user can comfortably grasp handle 60 regardless of whether he/she is right or left handed. The user flicks or brings the handle 60 forward sharply, as if casting in fly-fishing. The force of this movement causes the second member 14 to snap forward until the second member 14 is moved approximately 180 degrees to the first (extended) position. The device 10 is then locked in place in a self-locking fashion as described above.

It should be noted that any type of handle can be used with the present invention. Turning to FIGS. 9 and 10, a second embodiment of the present invention, comprised of at least first and second members 1012 and 1014, and device 1010, where the second member 1014 can move through approximately 180 degrees of motion with respect to the first member 1012. Again, FIGS. 9 and 10 show both the second (retracted) position and the first (extended) position respectively. Furthermore, multiple combinations of the elements and devices are contemplated. Correspondingly, where appropriate, the last three digits in the 1000 series of numerals depicted in FIGS. 9 and 10 are connected to elements which have the same function and/or structure as those described with regard to FIGS. 1–8.

While device 1010 and second member 1014 are similar to those depicted in FIGS. 1, 7 and 8, first member 1012 is somewhat different. As shown, first member 1012 is generally an S-shaped hand-held element. First member 1012 includes a front portion 1068 and a rear portion 1070 which, in one preferred embodiment, are tubular and thus substantially circular in cross-section.

As shown, front portion 1068 comprises a horizontal, elongated portion 1072 which is attached to device 1010, preferably by means of pivot aperture 1046 and pivot device 1048 similar to those described above. Rear end 1074 of the horizontal elongated portion 1072 connects the horizontal elongated portion 1072 with a substantially vertical portion 1076, which includes an upper end 1078 and a lower end 1080. The vertical portion 1076 is preferably oriented at an angle between about 100 and 140 degrees relative to the horizontal elongated portion 1072. A handgrip portion 1082, preferably comprised of plastic or rubber, is provided on vertical portion 1076 to provide a gripping means for the user.

Rear end 1074 includes a forearm engaging portion 1084 which comprise a forearm brace member 1086 and a forearm cradle member 1088. The forearm brace member 1086 includes a lower end 1090 that is connected to lower end 1080 of the vertical portion 1076. The forearm brace member 1086 terminates in an upper end 1092 that is connected to an upper end 1094 of an inner portion 1096 of the forearm cradle member 1088.

The forearm brace member 1086 is substantially parallel to the plane of the vertical portion 1076 but is slightly offset therefrom in a vertical plane as shown in FIGS. 9 and 10. The forearm cradle member 1088 includes inner portion 1096 and outer portion 1098 which together define a generally U-shaped member for receiving the forearm of the user. Upper portion 1100 of the outer portion 1098 can include an end cap 1102 to prevent any sharp edges about upper portion 1100 from scraping the skin of the user's forearm.

In operation, the hand of the user grasps the handgrip portion 1082 and the user's forearm is received within the forearm cradle member 1088 as shown in FIG. 10. The forearm brace member 1086 comfortably engages the inner or outer surface of the user's forearm, depending on whether the user is right or left handed. The user flicks or snaps the handle 1060 forward sharply, as if casting in fly fishing. The force of this movement causes the second member 1014 to snap forward until it is moved approximately 180 degree to the first (extended) position. The device 1010 is locked in place in a self-locking fashion as described above.

Turning now to FIGS. 11–17, yet another embodiment of the present invention is shown. Correspondingly, where appropriate, the last three digits in the 2000 series of numerals depicted in FIGS. 11–17 are connected to elements which have the same function and/or structure as those described with regard to FIGS. 1–10.

Referring now to FIG. 11 of the drawings, an alternate embodiment of a disengageable self-locking, foldable, pivotal bracket or connector device, generally designated 2010, is shown used with a first and second members, generally 2012 and 2014 respectively, in a first (extended) position. In the embodiment depicted in FIG. 11, first and second members 2012, 2014 comprise a handle and at least one support element.

Turning now to FIGS. 12 and 13, two side elevational views of the device 2010 of FIG. 11 are depicted with the members 2012, 2014, and the connecting elements shown in phantom. Device 2010 is again preferably a simple, inexpensive, one-piece construction of metal material, molded plastic and/or glass filled plastic, that allows the user to securely mount the members 2012, 2014 thereto. The device 2010 can be made by any method of manufacture suitable for making metal or plastic pieces including injection molding or machining.

Device 2010 includes a body member 2016 having a first portion 2018 and second portion 2020. As shown in the FIG. 11, device 2010 includes at least one connecting element 2022 and one locking connector element 2024 suitable for locking the device 2010 in both first (extended) or second (retracted) positions, both of which are defined in body member 2016.

FIGS. 11 and 12 further reveal that body member 2016 includes projecting portions 2028 and support portion 2030 (best seen in FIG. 13), defining at least one slot 2032. While slot 2032, projecting portions 2028 and support portion 2030 are shown and described, other configurations are contemplated. Slot 2032 enables device 2010 to operably receive the second member 2014, when second member 2014 is in the either the first or second positions.

Upon further inspection of FIGS. 11 and 12, it is noted that device 2010 includes at least one extended portion or wing 2034 having at least one beveled edge 2036 joined to and integral with projecting portions U-shaped portion 2026 of body member 2016 at first portion 2018. In one preferred embodiment shown in the drawings (best viewed in FIG. 12), device 2010 includes two wings 2034, each with opposing beveled edges 2036, that act to further define slot 2032 and receive the second member 2014 when in either the first or second position as shown in FIGS. 16 and 17.

As shown, slot 2032 also acts as a connecting aperture whereby first member 2012 can be secured to the device 2010. Alternatively a portion of body member 2016 can be hollowed out, defining at least one bore 2038 extending therein. At least one securing aperture 2042 is defined in body member 2016 and operably associated with proximal portion 2031 of slot 2032.

In one preferred embodiment, two securing apertures 2042 are formed in body member 2016 each in fluid communication with proximal portion 2031 of slot 2032. It is contemplated the securing aperture 2042 can be operably associated with a securing device 2044 (best seen in FIGS. 11, 16 and 17), whereby the first member 2012 can be secured to the device 2010. While a rivet is depicted, any type of securing device, including pins, screws, or even gluing, bonding, etc, are contemplated.

Attention may now be paid to the connecting element 2022 discussed briefly above. In one preferred embodiment shown in FIG. 11, connecting element 2022 comprises at least one pivot apertures 2046 (shown in phantom in FIGS. 11, 16 and 17, and in phantom in FIG. 15) defined in body member 2016. In one preferred embodiment, one set of pivot aperture 2044 is formed in each wing 2034 of body member 2016, which allows the second member 2014 to move in a pivotal manner about an axis defined by the apertures 2046. It is further contemplated that the pivot aperture 2046 can operably engage a pivot device 2048 operably associated with the second member 2014, whereby the second member 2014 can move in a pivotal manner in relation to the first member 12.

While it is not necessary that device 2010 be associated with members 2012 or 2014, in the preferred embodiment, a pivot device 2048, preferably an axial rivet, is in positional relationship with pivot apertures 2046 so that device 2010 is operably associated with the first member 2012. Furthermore, while an axial rivet is described, any suitable device, including screws, pins, rivets, is contemplated.

Having observed the details of the connecting element 2022, attention may now be give to the locking connector element 2024. Returning to the side elevational view of FIG. 11, locking connector element 2024 of device 2010 is preferably comprised of at least one aperture, generally designated a connecting aperture 2050, formed in body member 2016. In one embodiment, the at least one connecting aperture 2050 is formed in at least one wing 2034 in fluid communication with slot 2032 (shown in phantom in FIGS. 12 and 14).

While not shown or contemplated for the preferred embodiment, locking connector element 2024 could further comprises at least one indent or concave portion defined in the body member 2016 proximate connector aperture 2050. Furthermore, at least one other indent or concavity could defined in body member 2016 at second portion 2020 proximate slot 2032.

It is further contemplated that the at least one connector element 2024 is comprised of two sets of connecting apertures 2050 each formed in wings 2034 in spaced relationship to each other and in fluid communication with distal portion 2033 of slot 2032. As discussed above, it is contemplated that device 2010 can be used with at least two members, first and second members 2012 and 2014. In one preferred embodiment, locking connector element 2024, comprised of two sets of connecting apertures 2050 formed in the two wings 2034, is positional aligned and operably associated with a retaining device 2058, which in turn is operably associated with second member 2014.

In the depicted embodiment, retaining device 2058 is shown in a spaced relationship to both sets of apertures 2050 and is comprised of a pair of opposing detent pins operably connected together by a spring device (shown in phantom in FIG. 14) contained in second member 2014. While detent pins are depicted, any type of retractable or spring operated retaining device, including snap buttons, pins, detent balls, etc. is contemplated. Retaining device 2058 operably engages apertures 2050 (either apertures 2050A or 2050B as shown in FIGS. 16 and 17) when second member 2014 is in either the first or second positions.

FIG. 14 is a top plan view of the device 2010 of FIG. 11 depicting the first (extended) position of the first and second members 2012, 2014 and various connecting elements in phantom. Furthermore, the relationship of second member 2014, wings 2034 and slot 2032 is shown in FIG. 14. FIG. 15 on the other hand is a bottom plan view of the device 2010 of FIG. 11 depicting the second member 2014 and pivot aperture 2046 in phantom.

FIGS. 16 and 17 depict the first and second positions discussed above. FIGS. 16 and 17 reveal that, while first and second members 2012, 2014 can have many different embodiments, first member 2012 is depicted as handle 2060 having handgrip portion 2082 joined to device 2010 by slot 2032 and securing device 2042 as described above.

Second member 2014 is shown comprised of at least one pivoting support element 2106, herein further comprised of upper and lower support elements 2108 and 2110. While a unitary support element 2106 is contemplated, upper and lower support elements 2108 and 2110 are shown interconnected by adjustment device 2112.

As shown, lower support device 2110 is formed so that upper support device 2108 slidably fits therein. Adjustment device 2112 is comprised of a plurality of apertures 2114 formed in lower support element 2110, which can be operably engaged by a securing device 2116, which in turn operably engages a hole (not shown) formed in the distal end of upper support element 2108.

The length of support element 2106 is determined by moving upper support element 2108 in lower support element 2110 in a slidable fashion until the desired length is reached and a hole formed in upper support element 2108 lines up with one of the apertures 2114. Securing device 2116, preferably a pin, is placed and securably positioned in the lined up hole and aperture 2114.

While not required, lower support element 2110 is depicted having a tip 2118 and an open end cap 2120. Tip 2118 is a standard rubber crutch tip that could be attached directly to the distal end of lower support element 2110 as shown or offset therefrom. Tip 2118 acts to prevent lower support element 2110 from damaging any surface it is used on. End cap 2120 is shown attached to the proximal end of lower support element 2110 and acts to prevent injury to the use by covering the end thereof.

As shown, FIGS. 16 and 17 depict self-locking device 2010 pivotally connecting first and second members 2012, and 2014. Device 2010 includes body member 2016, with first and second portions 2018, 2020; and pivot aperture 2046, pivotally associated with second member 2014, and locking connector element 2024, securing second member 2014 in both first and second positions, formed therein. Body member 2016 defines slot 2032, whereby the slot 2032 operably receives the second member 2014.

Two extended portions or wings 2043 are joined to and integral with body member 2016 at first portion 2018 which, along with body member 2016, act to define the slot 2032. A pair of apertures 2050 are formed in each of the wings 2034 in spaced relationship to each other, so that the apertures 2050 are aligned and operably associated with retaining device 2058 associated with second member 2014, which operably engage the apertures 2050.

While many retaining devices 2058 are contemplated, in one preferred embodiment retaining device 2058 comprises a detent device operably associated with second member 2014 and in positional relationship with apertures 2050. FIG. 16 depicts the first (extended) position, with lower support element 2110 in a position approximately 180 degrees in relation to handle 2060, with retaining device 2058 operably engaging connecting aperture 2050B. While not depicted, locking connector element 2024 could include a concave portion 2054 formed in each of the wings 2034 proximate the apertures 2050, whereby the retractable retaining device 2058 may be accessed when it operably engages the apertures 2050.

As discussed above, connecting element 2022 further comprising a pivot aperture 2046 formed in the body member 2016 in each of the wings 1034 operably engaging pivot device 2048, which is operably associated with the second member 2014. In one preferred embodiment, the pivot device 2048 comprises an axial rivet operably associated with the second member 2014 and in positional relationship with the pivot apertures 2046. This operable association allows the second member 2014 to pivot on an axis defined by the pivot apertures 2046.

First member 2012 is depicted in FIG. 16 connected to device 2010. Proximal portion 2031 of slot 2032 acts as a connecting aperture formed in body member 2016, so that first member 2012 may be secured therein. At least two securing apertures 2043 are formed in body member 2016 in fluid communication with proximal portion 2031 and are operably associated with a securing device 2044. Preferably, securing device 2044 comprised a pair of rivets which engage the first member 2012 and securing apertures 2042, securing first member 2012 in proximal portion 2031 to the device 2010.

In the first (extended) position depicted in FIG. 16, lower support element 2110 is positioned approximately 180 degrees away from handle 2060, with retaining device 2058 operably engaging connecting aperture 2050B. In the second (retracted) position shown in FIG. 17, lower support element 2110 is positioned in proximity and parallel to handle 2060. In this position, retaining device 2058 operably engages connecting aperture 2050A. To move from the second to the first position, the user manually pushes retaining device 2058 inwards towards the center of the second member 2014, so that retaining device 2058 is disengaged from aperture 2050A. The second member 2014 may now be moved 180 degrees towards the first position, either manually or using the forward flicking motion described above. Additionally, an embodiment is contemplated having only one aperture 2050 (preferably 2050B) so that the manual manipulation previously described is not required.

As the second member 2014 is moved towards the first position, the retaining device 2058 comes in contact with and engage the rounded beveled edges 2036 of wings 2034 (or in one embodiment, the concave engaging portions 2056), so that the retaining device 2058 is moved inwards towards the center of the second member 2014. As the second member 2014 continues to move towards the first position, wings 2034 maintain the position of the retaining device 2058. When the second element 2014 is moved to the extended position, the retaining device 2058 is positionally aligned with the connector apertures 2050B, allowing the retaining device 2058 to move outwards, away from the center of the second member 2014, lockably engaging the second member 2014.

To move from the first to the second position, the user manually pushes retaining device 2058 inwards towards the center of the second member 2014, so that retaining device 2058 is disengaged from aperture 2050B. The second member 2014 may now be moved 180 degrees towards the second (retracted) position.

As the second member 2014 is moved towards the second (retracted) position, the retaining device 2058 again contacts and engage the rounded beveled edges 2036 of wings 2034 so that the retaining device 2058 is moved inwards towards the center of the second member 2014. As the second member 2014 continues to move towards the second position, wings 2034 maintain the position of the retaining device 2058. When the second member is moved to the second position, the retaining device 2058 is positionally aligned with the connector apertures 2050A, allowing the retaining device 2058 to move outwards, away from the center of the second member 2014, lockably engaging the second member 2014.

In operation, the user manually grasps the handle 60 as shown in FIG. 8 or grasps the handgrip portion 1082 so that the user's forearm is received within the forearm cradle member 1088 as shown in FIG. 10. The user flicks or brings handle 60/1060 forward sharply, as if casting in fly-fishing. The force of this movement causes the second member 14/1014 to snap forward until it is moved approximately 180 degrees towards the first (extended) position.

Concave engaging portions 56/1056 act to operably engage the retaining device 58/1058, so that the second member 14/1014 can be locked in the first position. As device 10/1010 and second member 14/1014 are moved towards the extended position, the retaining device 58/1058 comes in contact with, and engages, the concave engaging portions 56/1056 so that the retaining device 58/1058 is moved inwards towards the center of the first member 12/1012. As device 10/1010 and second member 14/1014 continue to move towards the extended position, wings 34/1034 act to maintain such inward position of the retaining device 58/1058.

When the device 10/1010 moves to the first (extended) position, the retaining device 58/1058 is positionally aligned with the connector apertures 50/1050, allowing the retaining device 58/1058 to move or spring outwards, away from the center of the first member 12/1012, lockably engaging the device 10/1010. The device 10/1010 is then locked in place in a self-locking fashion.

As provided above, two concave portions 50/1050 are formed in the wings 34/1034 proximate connector apertures 50/1050. The concave portions 50/1050 provide a means for the user to access retaining device 58/1058, when retaining device 58/1058 is engaging the apertures 50/1050. That is, the concave portions 50/1050 allow the user to use his fingers to push the retaining device 58/1058 in towards the center of first member 12/1012 so that the retaining device 58/1050 disengages the connector apertures 50/1050. This means that the second member 14/1014 is free to move towards the second (retracted) position, which the user can do manually.

To operate the embodiment depicted in FIGS. 16 and 17, the user manually pushes retaining device 2058 inwards towards the center of the second member 2014, so that retaining device 2058 is disengaged from aperture 2050A. The second member 2014 may now be moved 180 degrees towards the first (extended) position, either manually or using the forward motion described above.

As the second member 2014 is moved towards the first position, the retaining device 2058 comes in contact with and engages the rounded beveled edges 2036 of wings 2034 (or in one embodiment, the concave engaging portions 2056), so that the retaining device 2058 is moved inwards towards the center of the second member 2014. As the second member 2014 continues to move towards the first position, wings 2034 maintain the position of the retaining device 2058. When the second member 2014 is moved to the first position, the retaining device 2058 is positionally aligned with the connector apertures 2050B, allowing the retaining device 2058 to move outwards, away from the center of the second member 2014, lockably engaging the second member 2014.

To move from the first to the second position, the user again manually pushes retaining device 2058 inwards towards the center of the second member 2014, so that retaining device 2058 is disengaged from aperture 2050B. The second member 2014 may now be moved 180 degrees towards the second (retracted) position.

As the second member 2014 is moved towards the second position, the retaining device 2058 again contacts and engage the rounded beveled edges 2036 of wings 2034 so that the retaining device 2058 is moved inwards towards the center of the second member 2014. As the second member 2014 continues to move towards the second (retracted) position, wings 2034 maintain the position of the retaining device 2058. When the second element 2014 is moved to the second (retracted) position, the retaining device 2058 is positionally aligned with the connector apertures 2050A, allowing the retaining device 2058 to move outwards, away from the center of the second member 2014, lockably engaging the second member 2014.

Although the prior art has been described with reference to certain preferred embodiments, numerous modifications and variations can be made by those skilled in the art without departing from the novel spirit and scope of this invention.

What is claimed is:

1. A self-locking device for pivotally connecting first and second members comprising:
   a body member defining a pivot aperture pivotally associated with said first member; and
   a locking connector element defined in said body member for securing said device and said second member in a first position;
   a U-shaped portion defining a slot, whereby said slot operably receives said first member in said first position;
   two extended portions joined to and integral with said body member at a first portion; and
   said locking connector element comprising an aperture defined in each of said two extended portions, each said aperture being aligned and operably associated with a retaining device that is operably associated with said first member, whereby said retaining device operably engages said apertures when said device and said second member are in said first position.

2. The device of claim 1 wherein said retaining device comprises a detent element that is operably associated with said first member and in positional relationship with said apertures.

3. The device of claim 1 wherein said locking connector element includes a concavity portion defined in each of said two extended portions proximate said apertures, whereby said retaining device may be accessed when said retaining device engages said apertures.

4. The device of claim 3 wherein said locking connector element further includes two concave engaging portions defined in said body member at a second portion, proximate, and on opposing portions of, said slot.

5. The device of claim 4 wherein said pivot aperture is defined in each of said extended portions and operably engages a pivot device operably associated with said first member.

6. The device of claim 5 wherein said pivot device comprises an axial rivet that is operably associated with said first member and is in positional relationship with said pivot apertures.

7. The device of claim 6 further defining at least one connecting aperture in said body member, whereby the second member is secured to said device.

8. The device of claim 7 including at least one securing aperture defined in said body member in fluid communication with said at least one connecting aperture and operably associated with a securing device, whereby said second member is secured to said device by said securing device.

9. The device of claim 8 wherein said the first member comprises a handle.

10. The device of claim 9 wherein said second member comprises a work piece.

11. The device of claim 9 wherein said second member comprises a catch device.

12. The device of claim 11 wherein said second member comprises a net assembly.

13. A self-locking device for pivotally connecting a fist and a second member, comprising:
    a body member defining a pivot aperture pivotally associated with said second member;
    a locking connector element defined in said body member for securing said second member in either an extended position or a retracted position;
    said body member defining a slot, whereby said slot operably receives said second member;
    two extended portions, each joined to and integral with said body member;
    said locking connector element comprising a pair of apertures defined in each of said two extended portions and located in spaced relationship to each other, and
    said apertures being aligned and operably associated with a retaining device associated with said second member, whereby said retaining device operably engages said apertures.

14. The device of claim 13 wherein said retaining device comprises a detent device that is operably associated with said second member and is in positional relationship with said apertures.

15. The device of claim 14 wherein said locking connector element further includes a concavity portion defined in each of said two extended portions proximate said apertures, whereby said retractable retaining device may be accessed when it operably engages said apertures.

16. The device of claim 13 wherein said connecting element includes a pivot aperture defined in said body member in each of said extended portions operably engaging a pivot device operably associated with said second member.

17. The device of claim 16 wherein said pivot device comprises an axial rivet that is operably associated with said second member and is in positional relationship with said pivot apertures.

18. The device of claim 17 further including one connecting aperture defined in said body member, whereby said first member is secured to said device.

19. The device of claim 18 further including at least two securing apertures defined in said body member and in fluid communication with said connecting aperture and each said securing aperture is operably associated with a securing device, whereby said first member is secured to said device.

20. The device of claim 19 wherein said first member comprises a handle.

21. The device of claim 20 wherein the second member comprises a pivoting support element.

22. A self-locking device for pivotally interconnecting a first member with a second member comprising:
    a body including first mounting means for fixed connection with said second member and second mounting means for pivotable connection with said first member at a first location on said first member whereby said first member is pivotably connectable with said body and is after said connection pivotable relative to said body between a first extended position and a second retracted position;

said body further including a pair of wing portions for extending along portions of said first member when said first member is in said first extended position, said wing portions having aperture means defined therethrough;

detent means associatable with said first member at a second location on said first member that is in spaced, adjacent relationship relative to said first location on said first member, that is in adjacent relationship to said wing portions when said first member is in said first extended position, and that is in aligned and engaged relationship with said aperture means when said first member is in said first extended position;

said detent means including spring biasing means that yieldingly holds portions of said detent means in an outwardly projecting configuration relative to said first member;

said detent means further including portions that are generally receivable within said first member when said detent means is generally compressed into said first member against said spring biasing means; and cam means associated with said wing members for so compressing said detent means before said first member reaches said first extended position when said first member is so pivoted to said first extended position;

whereby said detent means releasably locks with said wing portions when said first member is in said first extended position.

23. The device of claim 22 wherein said detent means comprises a pair of opposed detent pins.

24. The device of claim 22 wherein said wing portions comprise a pair of wing members, each said wing member of said pair being located at a different opposed portion of said first member when said first member is in said first extended position, and each said wing member of said pair having said aperture means and said cam means defined therein.

25. The device of claim 24 wherein said aperture means in each said wing member has a concave depression defined about exterior perimeter portions thereof, thereby to provide manual access to said detent pin means to release said first member from said first extended position.

26. The device of claim 22 wherein said second mounting means comprises a pivot pin means that is engaged with said body and with said second member.

\* \* \* \* \*